(12) United States Patent
Lin et al.

(10) Patent No.: US 7,136,421 B2
(45) Date of Patent: Nov. 14, 2006

(54) CIRCUIT FOR COMPENSATING A DEGRADED SIGNAL AND ASSOCIATED METHOD

(75) Inventors: Jyh-Fong Lin, Taipei (TW); Chu-Yu Hsiao, Tai-Chung (TW); Chin-Chi Chang, Tai-Chung (TW); Ming-Yu Wu, Taipei Hsien (TW)

(73) Assignee: VIA Technologies Inc., Hsin-Tien (TW)

( * ) Notice: Subject to any disclaimer, the term of this patent is extended or adjusted under 35 U.S.C. 154(b) by 835 days.

(21) Appl. No.: 10/064,712

(22) Filed: Aug. 8, 2002

(65) Prior Publication Data

US 2003/0031263 A1 Feb. 13, 2003

(30) Foreign Application Priority Data

Aug. 10, 2001 (TW) .............................. 90119696 A

(51) Int. Cl.
*H04B 3/00* (2006.01)

(52) U.S. Cl. ..................................... 375/257; 375/288

(58) Field of Classification Search ................ 375/257, 375/288
See application file for complete search history.

(56) References Cited

U.S. PATENT DOCUMENTS

| 5,801,564 | A | * | 9/1998 | Gasparik | 327/170 |
| 5,844,439 | A | * | 12/1998 | Zortea | 327/307 |
| 5,864,584 | A | * | 1/1999 | Cao et al. | 375/244 |
| 6,237,424 | B1 | * | 5/2001 | Salmasi et al. | 73/861.17 |
| 6,408,032 | B1 | * | 6/2002 | Lye et al. | 375/257 |
| 6,433,608 | B1 | * | 8/2002 | Huang | 327/307 |

* cited by examiner

*Primary Examiner*—Chieh M. Fan
*Assistant Examiner*—Jia Lu
(74) *Attorney, Agent, or Firm*—Winston Hsu

(57) ABSTRACT

A signal compensation circuit and associated method dynamically compensate for signal baseline wandering in a transmission line. The compensation circuit has a detection circuit and a correction circuit. The detection circuit first compares a transmission signal with a reference level and generates a comparison result. The correction circuit then corrects the transmission signal according to the comparison result. The compensation circuit can adjust its compensation over time based on the quality of the transmission signal.

10 Claims, 4 Drawing Sheets

CIRCUIT FOR COMPENSATING A DEGRADED SIGNAL AND ASSOCIATED METHOD

BACKGROUND OF INVENTION

1. Field of the Invention

The present invention relates to a circuit for receiving a transmission signal and associated method, and more particularly, to a circuit for dynamically compensating a baseline wander of the transmission signal and associated method.

2. Description of the Prior Art

Please refer to FIG. 1, which is a schematic diagram of typical user terminals 10A and 10B connected to each other by a network transmission line 18. The user terminals 10A and 10B can be network servers, routers, clients, or other kinds of network terminals. The transmission line 18 is a network transmission line, such as an Unshielded Twisted Pair Category 5 (UTP-Cat.5) Ethernet cable. The user terminal 10A and the user terminal 10B utilize a signal circuit 12A and a signal circuit 12B respectively to transmit signals via the transmission line 18. The signal circuits 12A, 12B include transformers 16A, 16B and resistors R0a, R0b respectively that match the impedance of the transmission line 18. A transmitter 14A of the signal circuit 12A utilizes a differential transmission signal. That is, the transmission signal includes both positive and negative transmission signals transmitted by a pair of conductive lines.

The differential transmission signal is sent through two output terminals of the transmitter 14A to nodes P0A, P1A, and is then transformed onto the transmission line 18 by the transformer 16A. The differential transmission signal is received by the signal circuit 12B of the user terminal 10B after the differential transmission signal travels through two wires of the transmission line 18. The differential transmission signal is transformed by the transformer 16B and is sent to nodes P0B, P1B of the signal circuit 12B. The differential transmission signal is then sent to two differential input terminals of a receiver 14B, so that the user terminal 10B receives the signal from the user terminal 10A via the transmission line 18.

Several problems can occur during the signal transmission process. For instance, each signal circuit must match the electrical characteristic of the transmission line 18 in order for signal transmission to be effective. However, a high pass characteristic of the transformer in the signal circuit undesirably affects the signal level of the transmission signal.

The Ethernet network system suffers from this high pass problem. In Ethernet, an MLT-3 coded transmission signal is sent from the transmitter, transformer, to the transmission line. The coded transmission signal has a fixed baseline that is a longtime average of a level-changeable digital signal. The electrical characteristic of this signal is that the baseline of the signal relates to a low frequency (LF) component of the signal, which relates to the transmission data. When the coded transmission signal passes through the transformer and onto the transmission line, the direct current (DC) component of the LF is filtered out due to the high pass characteristic of the transformer. After the transmission signal passes through the transmission line to the signal circuit of another user terminal, the original baseline of the signal is degraded and baseline wander occurs.

For the purposes of explaining the baseline wandering phenomenon, please refer to FIG. 2 showing a prior art waveform-time diagram of the transmission signal during the signal transmission process in the network system shown in FIG. 1. The horizontal axis in FIG. 2 is time, and the vertical axis is signal amplitude. In FIG. 2, because the transmission signal is a differential signal, a waveform of a positive transmission signal shown is representative. At the user terminal 10A in FIG. 1, the transmission signal is generated as illustrated by a waveform 20. The waveform 20 is composed of three different waveform levels: a high level, a zero level, and a low level representing the different digital signals according to the MLT-3 code. A dotted line 20A and a dotted line 20B perfectly represent the overall signal profile of the waveform 20.

After the transmission signal passes through the transformer 16A, the transmission line 18 and the transformer 16B of the user terminal 10B, the LF component is filtered out due to the high pass characteristic of the transformer. The transmission line affects the original baseline and baseline wander occurs. A waveform 22 of the transmission signal affected by baseline wander is received at the node P0B of the user terminal 10B. The level of the waveform 22 has different deviations at different times, so that enveloping signal levels 22A and 22B of the waveform 22 appear to wander between a high level and low level. Therefore, the waveform 22 does not represent the original digital signal of the waveform 20 correctly because of the baseline wandering phenomenon.

Signal transmission errors caused by the baseline wandering phenomenon will now be briefly explained with reference to FIG. 1 and FIG. 2. A signal with a level higher than a fixed high reference level 24A is determined as a high level digital signal. A signal with a level lower than a fixed low reference level 24B is determined as a low level digital signal. The waveform 20 is originally generated by the transmitter 14A with respect to the high reference level 24A and low reference level 24B. The waveform 20 is then affected by the baseline wandering phenomenon during its transmission as previously described, and is finally received at the receiver 14B. The receiver 14B then interprets the waveform 22 with reference to the high reference level 24A and low reference level 24B and generates a received signal waveform 24.

The waveform 24 contains errors in time periods T1 and T2. In time period T1 the waveform 22 wanders low enough so that the original high signal in period T1 falls below the high reference level 24A. The original high signal during period T1 is interpreted as zero level as shown by waveform 24, incorrectly. A plurality of low level pulses error in a similar way during time period T2. The baseline wandering phenomenon thus causes the digital signal of the network transmission to not be received and decoded correctly.

In the prior art signal circuit, a fixed DC bias is added to the received transmission signal at the receiving terminal to compensate for baseline wandering. This solution is not adequate as the deviation of the baseline changes over time, and a fixed compensation cannot eliminate the signal deviation phenomenon entirely.

SUMMARY OF INVENTION

It is therefore a primary objective of the claimed invention to provide a signal compensation circuit and associated method for compensating signals by adjusting signal levels dynamically to solve the above-mentioned problem, and to ensure the quality of network signal transmissions.

According to the claimed invention, the signal compensation circuit comprises a detection circuit for detecting an enveloping signal level of a transmission signal transmitted via a transmission line, and a correction circuit for dynamically compensating the transmission signal according to a comparison result generated by comparing the transmission signal with a reference level.

It is an advantage that the claimed invention uses a dynamic detection and compensation method to adjust the signal levels so as to correct the deviations of the signal levels caused by the baseline wandering phenomenon. This ensures that the receiver receives the digital signal correctly, thus improving the signal receiving quality of network communication.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
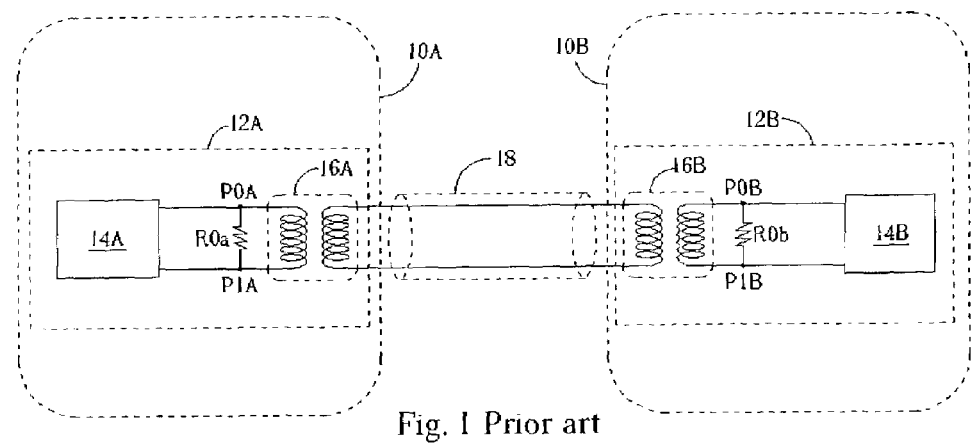
FIG. 1 is a schematic diagram of a prior art computer network.
Figure 2:
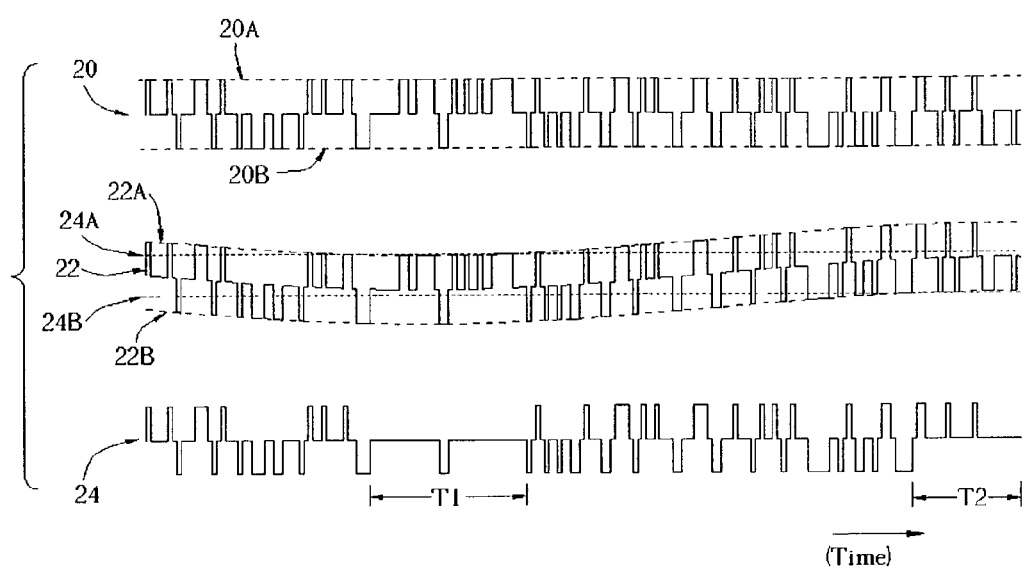
FIG. 2 shows waveforms at different nodes in the computer network shown in FIG. 1.
Figure 3:
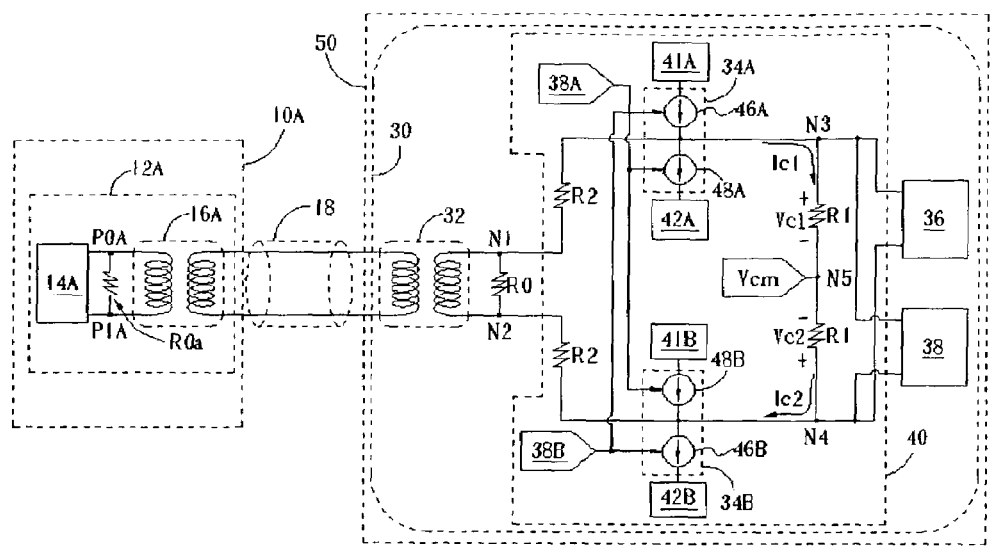
FIG. 3 is a schematic diagram of a signal circuit according to the present invention.

Please refer to FIG. 3, which is a schematic diagram of a signal circuit 30 used in a network system according to the present invention. A user terminal 10A and a user terminal 50 are connected with each other via a network transmission line 18. The user terminals 10A and 50 can be network servers, routers, clients, or other network terminals. The transmission line 18 can be an Ethernet Unshielded Twisted Pair Category 5 (UTP-Cat.5) cable, and a transmission signal can be an MLT-3 coded, or 100Base-T coded signal. The user terminal 10A and the user terminal 50 use a signal circuit 12A and a signal circuit 30 respectively to process transmission signals. The signal circuit 12A includes a transformer 16A and a resistor R0a that is matched to the impedance of the transformer 16A. The signal circuit 30 includes a transformer 32 and a resistor R0 that is matched to the impedance of the transformer 32. A transmitter 14A of the signal circuit 12A generates a transmission signal. A receiver 36 of the signal circuit 30 receives the transmission signal via the transmission line 18.

A detection circuit 38 and a correction circuit 40 are provided in the signal circuit 30 for the purpose of compensating baseline wander of the transmission signal to be received by the receiver 36. The detection circuit 38 detects a signal level of the transmission signal at a node N3 and a node N4, and compares the signal level with a reference level. If the signal level is larger than the reference level, a corresponding first control signal 38A and a corresponding second control signal 38B are generated by the detection circuit 38. The correction circuit 40 compensates for baseline wander of the transmission signal according to the results generated by comparing the transmission signal with the reference level by the detection circuit 38. After the differential transmission signal passes through the transformer 32 of the signal circuit 30, the positive and negative transmission signals are sent to a node N1 and a node N2 respectively. A second resistor R2 and a current source 34A are disposed on a signal transmitting path from the node N1 to the node N3 in the correction circuit 40. A second resistor R2 and a current source 34B are disposed on another signal transmitting path from the node N2 to the node N4 in the correction circuit 40. On the two signal paths for transmitting the differential signal, the node N3 and the node N4 are connected to a common-mode power supply by two first resistors R1. The common-mode power supply is used for providing the differential signal with a common-mode voltage $V_{CM}$ at a node N5. The common-mode voltage $V_{CM}$ for an MLT-3 coded, or 100 Base-T coded, signal is 1.8 volts.

The current sources 34A and 34B of the correction circuit 40 include controllable current sources 46A, 48A and 46B, 48B respectively. Bias circuits 41A, 42A and 41B, 42B provide appropriate bias voltages to the current sources 34A and 34B so that the current sources 34A and 34B can operate normally. The current intensities of the controllable current sources 48A and 48B are controlled by the first control signal 38A generated by the detection circuit 38. The current intensities of the controllable current sources 46A and 46B are controlled by the second control signal 38B also generated by the detection circuit 38. The controllable current sources 46A and 48A of the current source 34A together provide a compensation current Ic1 at the node N3. The controllable current sources 46B and 48B of the current source 34B together provide a compensation current Ic2 at the node N4. A compensation voltage Vc1 is generated across the resistor R1, between nodes N3 and N5, by the compensation current Ic1. Likewise, a compensation voltage Vc2 is generated across the resistor R1, between nodes N4 and N5, by the compensation current Ic2. After the differential transmission signal passes through the node N1 and the node N2, the positive and negative transmission signals pass through the resistors R2 to the node N3 and the node N4, respectively. The positive and negative transmission signals refer to the common-mode voltage $V_{CM}$ as a center voltage level and utilize the resistors R2 as a loading. The compensation voltages Vc1 and Vc2 are added to the positive and negative transmission signals, respectively. In the preferred embodiment of the present invention, the intensities of the compensation currents Ic1 and Ic2 are substantially equal. The two first resistors R1, having the same resistance, are provided so that the compensation voltages Vc1 and Vc2 are also substantially equal. After compensation, the transmission signal is received by the receiver 36 at the node N3 and the node N4 in a differential manner so that the transmission signal is transferred from the user terminal 10A to the user terminal 50.

Figure 4:
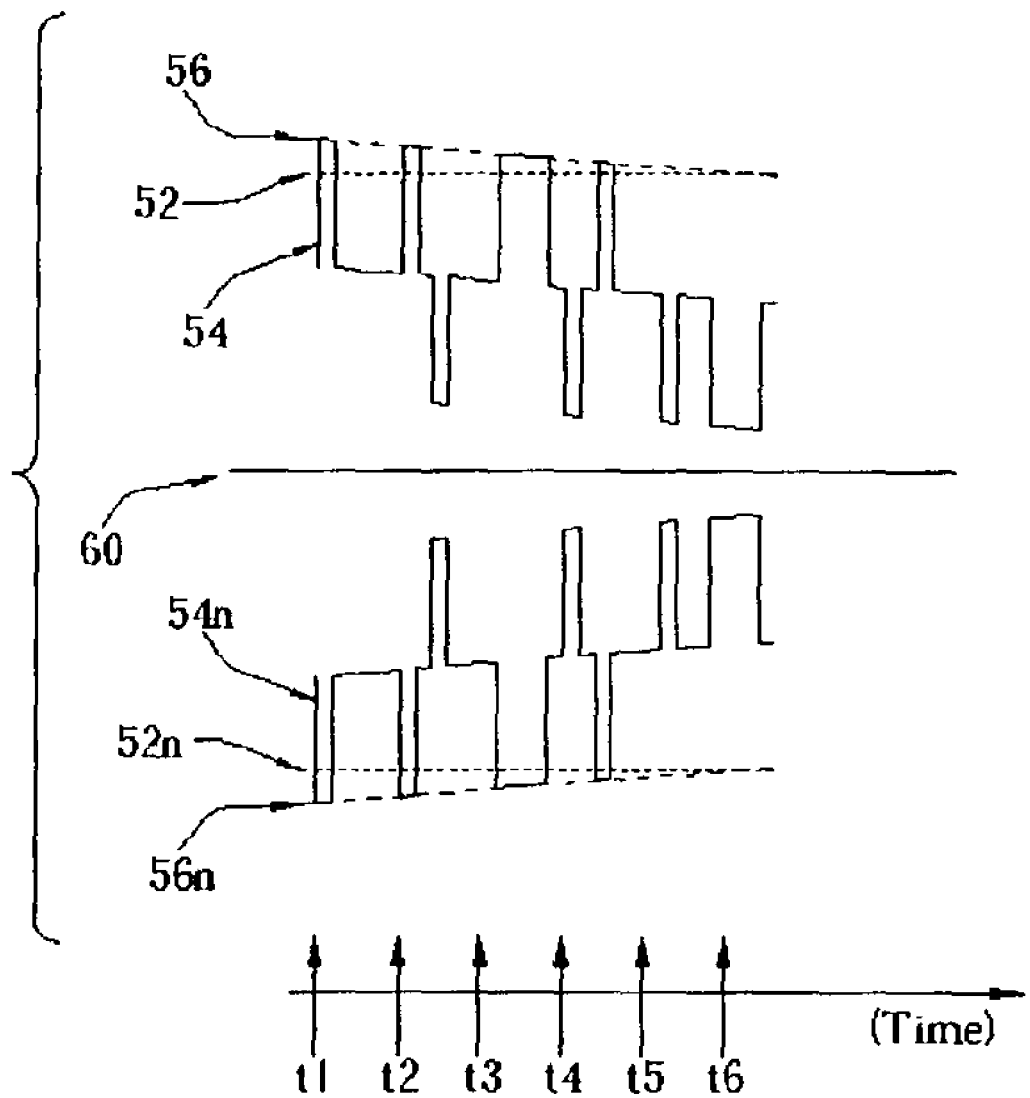
FIG. 4 shows waveforms by the signal circuit shown in FIG. 3.

The operation for correcting baseline wander according to this invention is described as follows. Please refer to FIG. 4, which is a waveform of related signals during baseline wander correction of the transmission signal. The horizontal axis in FIG. 4 represents time, and the vertical axis represents signal magnitude. A waveform 54 shown in FIG. 4 is the waveform of the positive component of the differential transmission signal, at the node N3. An enveloping signal level 56 represents the positive signal profile of the waveform 54. As mentioned previously, the enveloping signal level 56 of the waveform 54 deviates with time due to baseline wander, so that the enveloping signal level 56 of the waveform 54 of the transmission signal does not form an ideal straight horizontal line. The detection circuit 38 in the present invention detects a difference between the enveloping signal level 56 and a fixed reference level 52 at a time t1. As illustrated in FIG. 4, the enveloping signal level 56 is larger than the reference level 52. Accordingly, the detection circuit 38 generates the first control signal 38A and the second control signal 38B to control the current source 34A and the current source 34B respectively to produce the negative compensation current Ic1 and the negative compensation current Ic2 (the flowing directions of the compensation currents Ic1 and Ic2 can be seen in FIG. 3).To accomplish this, the second control signal 38B turns off the controllable current sources 46A and 46B, and the first control signal 38A turns on the controllable current sources 48A and 48B. The negative compensation currents Ic1 and Ic2 cause the compensation voltages Vc1 and Vc2 to be negative as well (the polarization directions of the compensation voltages Vc1 and Vc2 are shown in FIG. 3). The resulting negative compensation voltage Vc1 is added to the positive transmission signal at the node N3, and the enveloping signal level 56, which is larger than the reference level 52, is reduced and thus corrected.

After the positive transmission signal at the node N3 has been corrected, the detection circuit 38 detects the enveloping signal level 56 and the reference level 52 every predetermined period. At a time t2, the detection circuit 38 detects that the enveloping signal level 56 has been corrected but is still larger than the reference level 52. The detection circuit 38 generates the first control signal 38A and second control signal 38B to control the current source 34A and the current source 34B to further negatively compensate the enveloping signal level 56 via the compensation voltage Vc1. Finally, after this correction procedure is repeated several times, shown as times t2 through t6 in FIG. 4, the enveloping signal level 56 will be eventually corrected.

The signal level may also wander lower than a predetermined level. Suppose that the detection circuit 38 detects an enveloping signal level 56 that is lower than the reference level 52. The detection circuit 38 controls the current sources 34A and 34B to generate a positive compensation current Ic1 resulting in a positive compensation voltage Vc1. The positive compensation voltage Vc1 then adjusts the enveloping signal level 56 positively.

Each control current source can be implemented by a plurality of unit current sources, with each unit current source providing a fixed current. For example, one or more unit current sources can be activated in the controllable current source 46A to increase the positive compensation current Ic1. Similarly, one or more unit current sources can be activated in the controllable current source 48A to generate the negative compensation current Ic1.

In summary, the above-mentioned process of comparing the enveloping signal level 56 with the reference level 52 using the detection circuit 38, and then generating the compensation current from the current source, and finally compensating the transmission signal will be repeated to dynamically compensate the signal level deviations due to baseline wander. Although the above description uses the positive transmission signal at the node N3 as an example, the negative transmission signal at the node N4 is compensated for at the same time. The node N3 and the node N4 are symmetrically provided with respect to the common-mode power supply of the node N5. Consequently, the controllable current sources 48A and 48B controlled by the first control signal 38A and the controllable current sources 46A and 46B controlled by the second control signal 36A cause the compensation current Ic1 to be substantially equal to the compensation current Ic2 and the compensation voltages Vc1 and Vc2 to be substantially thus equal. The polarizations of the compensation voltages correspond with the positive and negative signals of the differential transmission signal to respectively compensate the positive and negative signals.

The symmetric operation of the correction circuit 40 will now be explained. A waveform 54n shown in FIG. 4 is a waveform of the negative transmission signal of the differential transmission signal at the node N4. A negative signal envelope 56n represents the extent of the waveform 54n. A horizontal signal level 60 represents a stable DC level provided by the common-mode voltage $V_{CM}$ at the node N5. The waveform 54n of the negative transmission signal is thus the negative mirror image of the waveform 54 of the positive transmission signal, with reference to the common-mode voltage $V_{CM}$ acting as a voltage reference. If the enveloping signal level 56n of the negative transmission signal deviates from a reference level 52n because of the baseline wandering phenomenon, the detection circuit 38 shown in FIG. 3 detects the difference between the enveloping signal level 56n and the fixed reference level 52n. In fact, the nature of the differential signal prescribes mirrored deviations of the positive and negative transmission signals. From the circuit diagram shown in FIG. 3 of the present invention, the voltage at the node N3 is equal to $V_{CM}$+ Ic1*R1, and the voltage at the node N4 is equal to $V_{CM}$- Ic2*R1. Due to the symmetrical nature of the positive and negative differential signals and the construction of the correction circuit 40, the compensation current Ic1 is equal to the compensation current Ic2. The mirror image property of the correction circuit 40 compensates the positive and negative transmission signals equally in magnitude but opposite in direction. As shown in FIG. 4, the waveform 54 of the positive transmission signal at time t2 is corrected downward as the waveform 54n of the negative transmission signal is corrected upward. Therefore, the positive and negative components of the differential transmission signal are corrected simultaneously.

Compared with the prior art, which uses a fixed DC bias voltage, the present invention dynamically detects and compensates the deviations of the signal level caused by baseline wandering. The present invention thus ensures that the receiver receives the digital signal correctly, and significantly improves the receiving quality of network communication.

Those skilled in the art will readily observe that numerous modifications and alterations may be made while retaining the teachings of the invention. Accordingly, the above disclosure should be construed as limited only by the metes and bounds of the appended claims.

What is claimed is:

1. A signal compensation circuit comprising:
   a detection circuit for detecting a signal level of a transmission signal transmitted via a transmission line; and
   a correction circuit for dynamically compensating the transmission signal according to a comparison result generated by comparing the transmission signal with a reference level, the correction circuit comprising:
   a first resistor; a second resistor coupled between the first resistor and the transmission line; and
   a plurality of unit current sources selectively turned on or off according to a difference between the transmission signal and the reference level, the plurality of unit current sources generating a compensation current according to a result generated from the detection circuit, wherein the compensation current passes through the first resistor to generate a compensation voltage for compensating the signal level of the transmission signal.

2. The signal compensation circuit of claim 1 wherein the transmission signal is transmitted via the transmission line.

3. The signal compensation circuit of claim 2 wherein the transmission line is an Ethernet transmission line.

4. The signal compensation circuit of claim 1 wherein the transmission signal is an MLT-3 coded signal.

5. The signal compensation circuit of claim 1 wherein the transmission signal is a 100Base-T signal.

6. The signal compensation circuit of claim 1 wherein the detection circuit detects a difference between the transmission signal and the reference level at intervals of a predetermined period.

7. The signal compensation circuit of claim 1 wherein the transmission signal is a differential signal.

8. The signal compensation circuit of claim 7 further comprising a common-mode power supply for providing the differential signal with a common-mode voltage.

9. The signal compensation circuit of claim 7 wherein the signal compensation circuit compensates a baseline wander of the transmission signal.

10. The signal compensation circuit of claim 8 wherein the common-mode voltage is 1.8 volts.

* * * * *